Aug. 9, 1949.  L. R. ROBINSON ET AL  2,478,711
PIPE COATING APPARATUS
Filed Dec. 23, 1947  3 Sheets-Sheet 1

INVENTORS
Lawrence S. Robinson &
Walter S. Lang
BY
ATTORNEY

Aug. 9, 1949.  L. R. ROBINSON ET AL  2,478,711
PIPE COATING APPARATUS

Filed Dec. 23, 1947  3 Sheets-Sheet 2

INVENTORS
Lawrence S. Robinson &
Walter S. Lang
BY
ATTORNEY

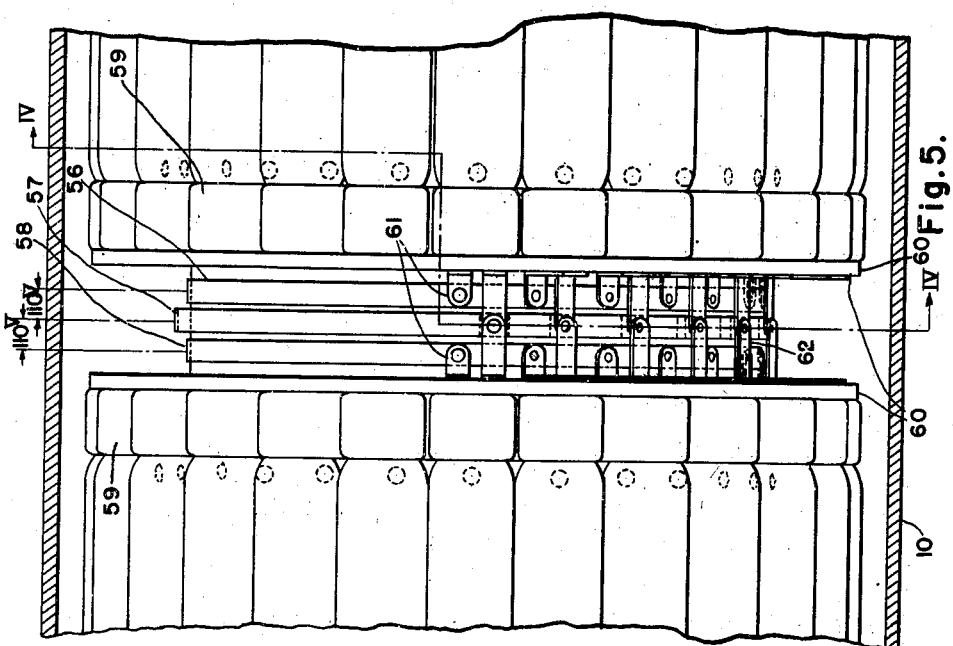

Patented Aug. 9, 1949

2,478,711

UNITED STATES PATENT OFFICE 2,478,711

PIPE COATING APPARATUS

Lawrence R. Robinson, Mount Lebanon, and Walter S. Lang, Pittsburgh, Pa., assignors to Pittsburgh Pipe Cleaner Company, Pittsburgh, Pa., a company of Pennsylvania Application December 23, 1947, Serial No. 793,472

9 Claims. (Cl. 91—55)

The invention relates, generally, to pipe coating apparatus and, more particularly, to pipe coating apparatus for water pipes, sewers and the like which are buried underground, rendering the inside of the pipe wet or damp even when empty.

The object of the invention is to provide, in pipe coating apparatus, for drying the inside of a pipe before the coating material is applied, applying the coating material and for drying the coating material after it is applied.

Other objects of the invention will in part be obvious, and will in part appear hereinafter.

The invention, accordingly, comprises the features of construction, combination of elements, and arrangements of parts which will be exemplified in the construction hereinafter set forth and the scope of the application of which will be indicated in the claims.

For a fuller understanding of the nature and objects of the invention, reference should be had to the following detailed description, taken in connection with the accompanying drawings, in which:

Fig. 4 is a view, in section, along the line IV—IV of Fig. 5; and

Fig. 5 is a view, in elevation, showing details of the lamp structure provided for drying the pipe and applied coating.

Figure 1:
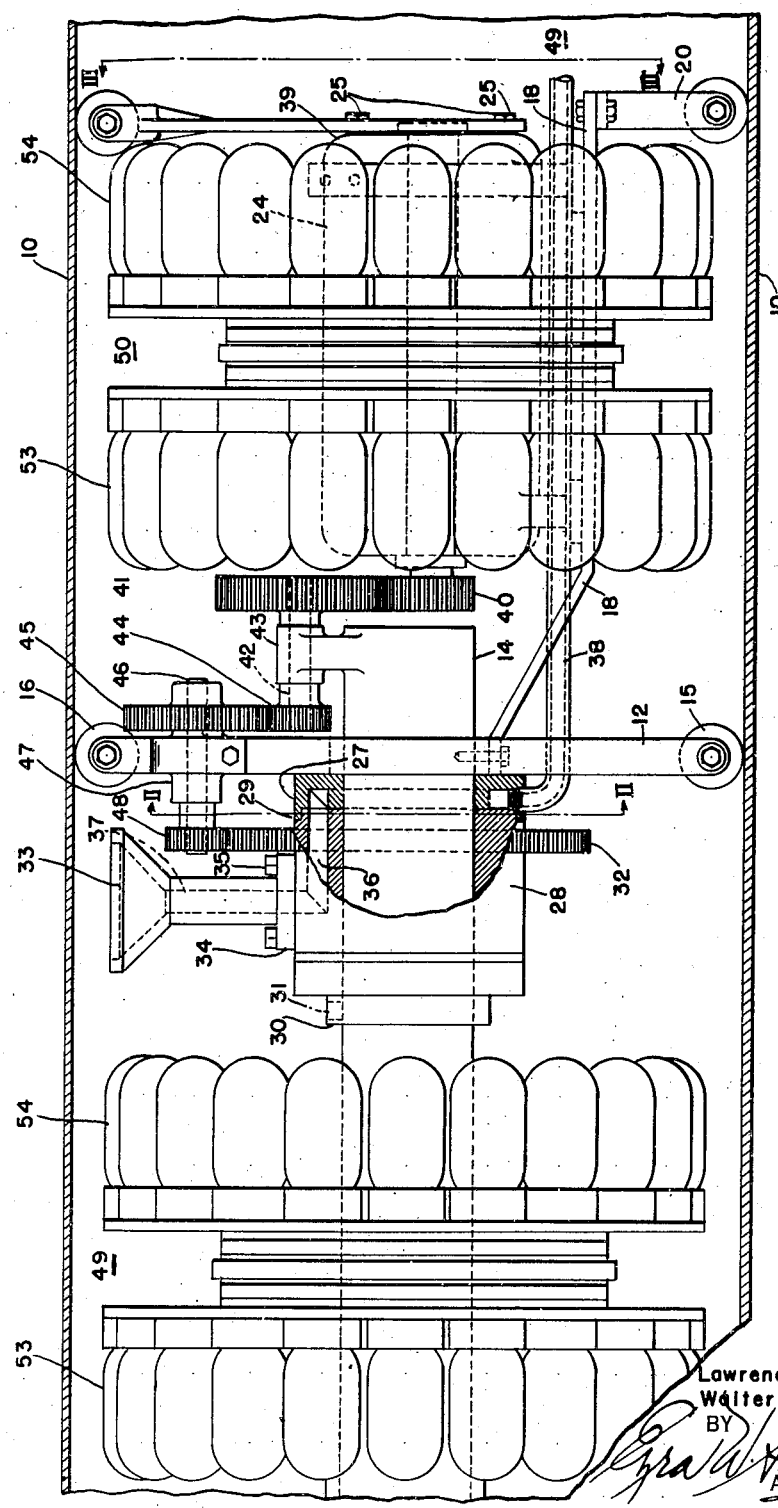
Figure 1 is a view, partly in section and partly in side elevation, of a pipe coating apparatus disposed in a section of pipe showing details of the structure and the manner in which it is propelled through a pipe.

Referring now to Figure 1, 10 designates a pipe section, such as might be found in a water line or sewer, and which needs to be coated from time to time to protect it from both corrosion and erosion, and to lower the coefficient of friction to increase its capacity for the handling of fluids.

Figure 3:
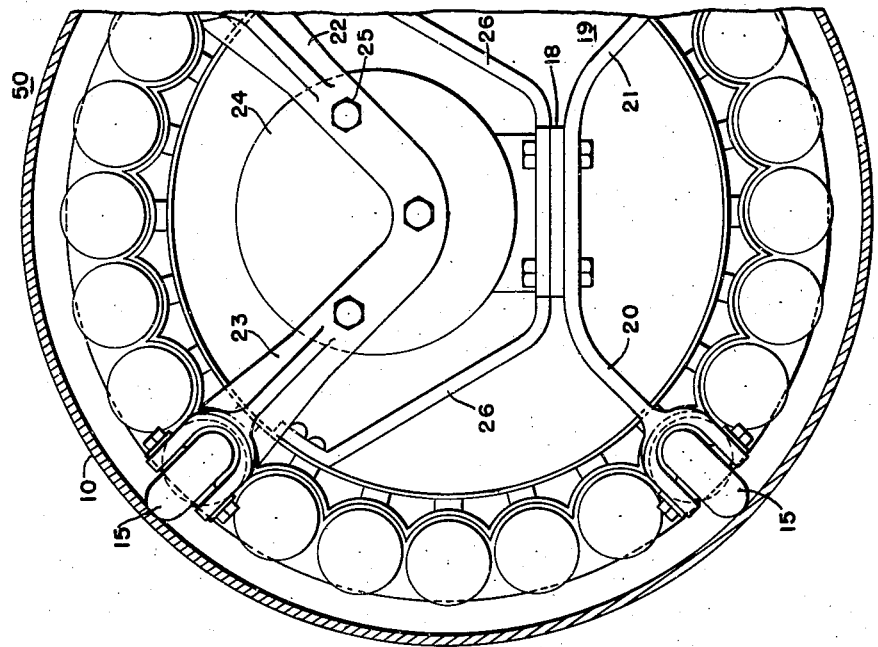
Fig. 3 is an end view looking from the line III—III of Fig. 1.
Figure 2:
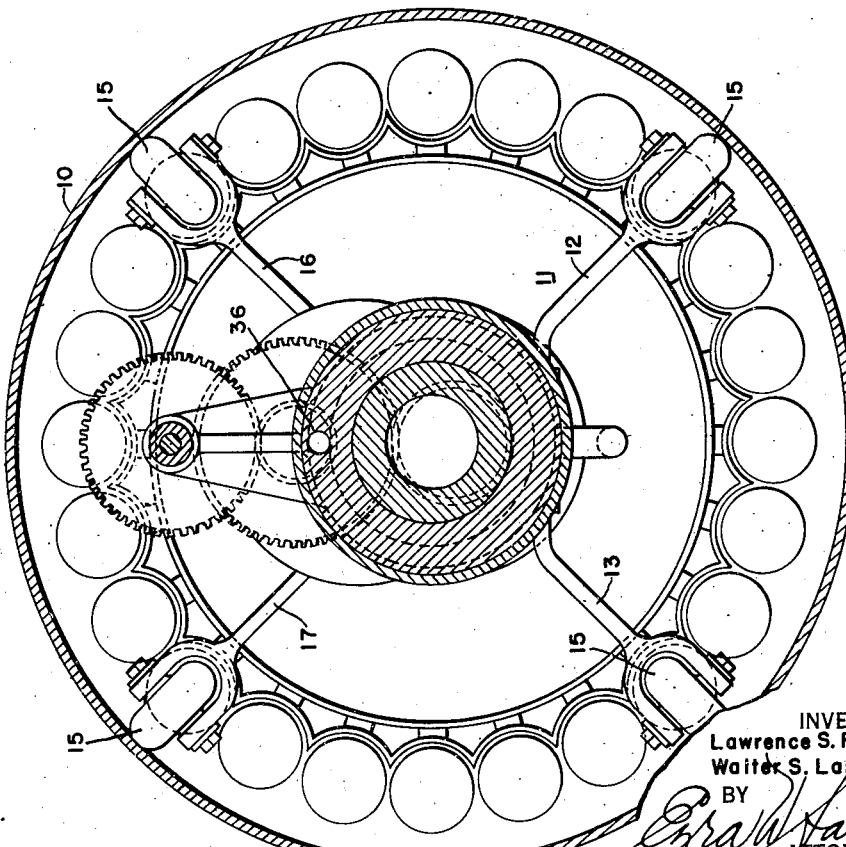
Fig. 2 is a view, in section, along the line II—II of Fig. 1.

The pipe coating apparatus comprises a carriage best shown in Figs. 1, 2 and 3. The carriage consists of a forward spider, shown generally at 11, which has four radiating legs evenly spaced around the pipe. The lower pair of legs 12 and 13 form a saddle for carrying a tubular member 14 which will be described in more detail hereinafter. At the lower ends, the legs 12 and 13 are bifurcated as shown, and have wheels 15 mounted therein. These wheels may be mounted in any suitable manner well-known in the art. The two upper legs 16 and 17 of the carriage 11 are united by a strap which fits over the tubular member 14. The ends of the legs 16 and 17 are also bifurcated and have wheels 15 mounted therein.

As illustrated, the wheels 15 of the carriage 11 contact the pipe or tubular member 10 at 90° intervals. The carriage should fit snugly in the pipe; and, in order to adapt the apparatus to different sizes of pipe, the legs 12, 13, 16 and 17 may be made adjustable in any manner well known in the art. In connecting the saddle provided on the lower pair of legs 12 and 13 to the tubular member 14, lag screws may be employed.

The forward spider, shown generally at 11, is connected to a trailing spider structure, shown generally at 19 in Fig. 3, by means of a support 18. The support 18 seats on the strap or saddle extending between the legs 20 and 21. The upper section of the spider 19 comprises two leg members 22 and 23 forming a V and connected to a motor casing 24 by means of lag screws 25. A double-armed brace 26 is bolted to the support 18 and the strap extending between the legs 20 and 21 of the lower section of the spider 19. The double-armed brace supports a cylindrical member to be described in detail hereinafter.

The apparatus for applying the coating material is disposed on the forward or leading end of the carriage, and is supported mostly by the leading spider 11. The apparatus for delivering the coating material comprises the tubular member 14 referred to hereinbefore, which is connected to the saddle extending between the legs 12 and 13 by lag screws. Disposed on the tubular member 14, just forward of the spider 11, is a channel-shaped annular member 27 which forms a gland through which the coating material is delivered. Forward of the gland 27 is cylindrical member 28 which is rotatably mounted on member 14. As best shown in Fig. 1, the cylindrical member 28 and the gland 27 are rabbeted, at 29, so as to make tight engagement. The cylindrical member is held in tight engagement with the gland 27 by means of a ring 30 mounted on the tubular member 14 and held in position by a lag screw 31.

In order to rotate the cylindrical member 28, a ring gear 32 is mounted thereon and attached thereto in any suitable manner, as by means of a key (not shown). The number of teeth provided in the ring gear will depend upon the speed at which the cylindrical member is to be driven.

A delivery head 33 is provided on the cylindrical member 28. As shown, the delivery head is attached to the cylindrical member 24 by means of a flange 34 attached to the cylindrical member by lag screws 35.

Communication between the gland 27 and the delivery head 33 is established by drilling an opening 36 in the cylindrical member 28 which communicates with the channel 37 in the delivery head.

The coating material, such as paint or a liquid bituminous material, may be delivered to the gland 27 through a pipe 38. The source of the coating material is not illustrated, since a tank in which the coating material may be put under pressure or other suitable means well known in the art may be employed for delivering the coating material through the pipe 38. In order to drive the delivery head 33, and if desirable the whole carriage, a motor 39 is employed and disposed on the support 18.

A pinion 40 is mounted on the forward end of the motor shaft which meshes with another gear 41 mounted on a jack shaft 42 which is disposed in a bearing 43 provided on the cylindrical member 14. The bearing 43 may be any well-known type and its support cast integral with tubular member 14. In order to provide a suitable gear drive and proper speed, a pinion 44 is mounted on the forward end of the jack shaft 42 to mesh with another gear 45 carried by a jack shaft 46 rotatably mounted in a bearing 47 disposed in the leading spider 11. On the forward end of the jack shaft 46 is another pinion 48 which meshes with the ring gear 32.

The drive for the delivery head may be traced from the motor 39 through pinion 40, gear 41, jack shaft 42, pinion 44, the gear 45, jack shaft 46, the pinion 48 on the forward end of the jack shaft 46, to the ring gear 32. As the ring gear 32 is driven, the cylindrical member 28 is rotated, swinging the delivery head 33 around the inside of the pipe as the carriage moves forward.

As is well-known, the inside of pipe lines buried underground or in certain plants are damp. When coating material, such as paint and bitumen and the like, are applied to damp surfaces, they do not adhere as tenaciously as desired. Therefore, before coating material is applied to the inner surfaces of water pipes and sewers, it is highly desirable that they be rendered as dry as possible. In this particular pipe coating apparatus, a drying unit is disposed in the lead of the coating apparatus. In this embodiment of the invention, a drying unit, which comprises a double ring of infra-red lamps, is provided. However, it is to be understood that any other suitable drying means, such as the well-known resistance heating elements employed in ovens, or any other suitable means for driving off moisture, may be employed.

In this particular coating apparatus, rings of infra-red lamps have been utilized because of the facility with which they may be mounted and the ease with which they may be focused to heat the pipe or sewer. The leading heating unit, shown generally at 49, is similar in construction to the trailing heating unit shown generally at 50. Both heating units comprise cylindrical members 51 which carry reflectors 52. The leading heating unit 49 is disposed on the tubular member 14. Any suitable method well-known in the art may be employed for supporting the cylindrical member on the tubular member 14. A trailing heating unit 50 is supported on the trailing spider 19 by the double-armed bracket 26, best shown in Fig. 3.

Since the two heating units are similar in construction, it will suffice to describe one in detail.

Referring now to Figs. 4 and 5, each heating unit 49 and 50 comprises two rings 53 and 54 of infra-red lamps. As shown, each ring comprises twenty-four lamps. The number of infra-red lamps will depend upon the size of the heating unit it is desired to provide, and the size of the unit will depend on the work at hand. The cylindrical members 51 which carry the lamps and their reflectors 52 may be made of any suitable material. If made of a metal, it will be necessary to insulate the connections for the lamps; while, if they are made of some suitable insulating composition, the problem of insulating the connections for the lamps is easier. The reflectors 52 may be made of some suitable reflecting metal well-known in the art. These reflectors are mounted outside of the cylinders 51 on supports 55.

In order to supply the rings of infra-red lamps, any suitable supply system may be provided. In this particular instance, since there are two rings of lamps in each heating unit, a three-wire system will be employed. In order to connect the lamps to the three-wire system, conducting rings 56, 57 and 58 are disposed on the cylinders 51. These conducting rings may be connected to a three-wire system in any suitable manner, making the central ring 57 the neutral and the 110-volt lines being connected to the conducting rings 56 and 58.

The sockets 59 for the infra-red bulbs of the rings 53 and 54 are mounted on plates 60 carried by the cylindrical members 51. These sockets may be mounted in any suitable manner well-known in the art.

In order to supply the lamps, conducting straps 61 are connected between one terminal of the sockets 59 and the supply rings 56 and 58. Of course, in making these connections, it is necessary to insulate the rings 56, 57 and 58 from the cylindrical member 51 if it is metal. Methods for doing this are well-known in the art. The other terminals of the sockets 59 are connected by the long straps 62 to the neutral ring 57. In this manner, any predetermined number of bulbs in each of the rings 53 and 54 may be supplied with the necessary current for energizing them. Any suitable means well-known in the art (not shown) may be provided for turning the electric current on and off, as needed in the operation of the pipe coating apparatus.

The current for operating the motor 39 and for supplying the heating units 49 and 50 may be supplied through any suitable conductors well-known in the art. It is known to provide supply conductors on drums so that the pipe coating apparatus may be moved along the pipe as desired, the drum serving to play out the conductors as the carriage moves forward, and to reel them in as the carriage is drawn back.

In the operation of the pipe coating apparatus, the leading heating unit subjects the section of the pipe to be coated immediately ahead of the delivery head 33 to intensive heating for a short time. It has been found by experiment that unless some unusual conditions exist, the pipe can be dried sufficiently to properly receive the coating of paint or bitumen so that it will adhere tenaciously.

As the carriage moves forward, the pipe that has been dried and heated by the leading heating element 49 is coated through the delivery head 33. As has been pointed out hereinbefore, the delivery head is driven from the motor 39 through a train of gears. The delivery head rotates around the tubular member 14 and delivers the coating material in something of a spiral as the pipe coating apparatus is moved forward.

The speed of the carriage can be related to the speed of the delivery head so that all of the inside of the pipe will be covered with the coating material delivered from the head 33. Means for moving the carriage forward at a predetermined speed, so that all of the inside of the pipe will be subjected to coating material, are well-known in the art.

The coating material supplied through the pipe 38 may be delivered under pressure, and the coating material discharged by means of compressed air. This is common practice in the art.

Since certain changes may be made in the above device and different embodiments of the invention can be made without departing from the scope thereof, it is intended that all matter contained in the above description or shown in the accompanying drawings shall be interpreted as illustrative and not in a limiting sense.

We claim as our invention:

1. In pipe treating appartus, in combination, a carriage disposed to be propelled through the pipe, a heating unit for drying the pipe disposed on the leading end of the carriage, a pipe coating device carried by the carriage and following the heating unit, and a second heating unit disposed on the rear end of the carriage following the pipe coating device for drying the coating material applied to the inside of the pipe by the pipe coating device.

2. In pipe treating apparatus, in combination, a carriage adapted to be propelled through a pipe to be treated, a radiant heating unit at one end of the carriage for drying the pipe, a pipe coating unit disposed to follow the radiant heating unit to coat the pipe as it is dried, and a second radiant heating unit trailing the pipe coating unit to dry the coating material applied to the inside of the pipe.

3. In pipe treating apparatus, in combination, a carriage adapted to be propelled through the pipe to be treated, a radiant heating unit disposed in front of the carriage to dry the pipe to be treated, means for applying a coating material mounted on the carriage to coat the pipe dried by the heating unit, a second radiant heating unit disposed on the carriage trailing the means for coating the pipe for drying the coating material, and means for supplying coating material to the pipe coating apparatus and actuating the pipe coating apparatus.

4. In pipe treating apparatus, in combination, a drying unit for drying the pipe to be treated, coating mechanism trailing the drying unit, a second drying unit following the coating apparatus to dry the coating material, the drying units and coating mechanism being so connected that they move in a predetermined spaced relation, and means for operating the coating apparatus at a predetermined speed to correspond with the rate at which the pipe is dried.

5. In pipe treating apparatus, in combination, a plurality of infra-red bulbs arranged in a ring for drying the inside of a tubular member, coating apparatus for applying a coating material to the inside of the pipe as it is dried, a second heating unit of infra-red lamps arranged in a ring to dry the coating material applied to the pipe, means for maintaining the drying units and the coating apparatus in a predetermined cooperative spaced relationship and means for operating the coating mechanism and for propelling the drying units and coating mechanism through a pipe.

6. In pipe treating apparatus, in combination, an infra-red heating unit having the infra-red lamps arranged in circular banks for drying the pipe, a carriage for carrying the infra-red heating unit, pipe coating mechanism carried by the carriage and disposed to follow the infra-red heating unit, a second infra-red heating unit disposed on the carriage and following the pipe coating mechanism, and means for actuating the pipe coating mechanism to apply coating material as the carriage is propelled through the pipe.

7. In pipe treating apparatus, in combination, a carriage adapted to be propelled through a pipe, an infra-red heating unit disposed on the forward end of the carriage, the infra-red heating unit comprising rings of infra-red lamps for drying the pipe, a delivery head for delivering coating material to the inside of the pipe rotatably disposed on the carriage, an annular gland disposed to communicate with the delivery head as the latter is rotated to coat the inside of the pipe, means for supplying coating material to the annular gland as the delivery head rotates, a second infra-red heating unit disposed on the carriage to trail the delivery head, the second heating unit comprising rings of infra-red lamps disposed to dry the coating material as it is applied by the delivery head, and means for actuating the delivery head as the carriage is moved through the pipe.

8. In pipe treating apparatus, in combination, a carriage adapted to be moved through a pipe, a support disposed on the carriage and extending forward, an infra-red heating unit mounted on the forward end of the support, the infra-red heating unit comprising a ring of infra-red lamps disposed in a ring for heating the inside of a pipe, reflectors disposed inside of the ring of infra-red lamps to direct the rays against the pipe, means for coating the pipe with a coating material disposed on the carriage and trailing the heating unit, a second heating unit mounted on the carriage trailing the pipe coating apparatus, the second heating unit comprising a ring of infra-red lamps, a reflector for directing the rays outwardly against the pipe, and means for actuating the coating mechanism.

9. In pipe treating apparatus, in combination, a carriage adapted for movement in a pipe, a support carried by the carriage, the support extending forwardly of the carriage, an infra-red heating unit carried by the support, the infra-red heating unit including a plurality of lamps arranged in a ring, reflectors disposed inside of the infra-red lamps for directing the rays against the pipe, a rotatably mounted delivery head for delivering coating material to the inside of the pipe, a drive for actuating the rotatably mounted delivery head, an annular gland for maintaining communication with the delivery head as it rotates, a supply pipe for delivering coating material to the gland, means for actuating the delivery head to coat the inside of the pipe, a second infra-red heating unit, the lamps of the infra-red heating unit being arranged in a ring, a reflector disposed inside of the lamps to direct the infra-red rays against the coating material to dry it, and means for actuating the delivery head disposed on the carriage inside the second infra-red heating unit.

LAWRENCE R. ROBINSON.
WALTER S. LANG.

REFERENCES CITED

The following references are of record in the file of this patent:

UNITED STATES PATENTS

| Number | Name | Date |
|---|---|---|
| 2,125,025 | Huckfeldt et al. | July 26, 1938 |
| 2,132,391 | Boylan | Oct. 11, 1938 |
| 2,337,740 | Albright | Dec. 28, 1943 |